Oct. 18, 1932.  E. A. ROCKWELL  1,882,927
BRAKE MECHANISM
Original Filed Oct. 8, 1927  2 Sheets-Sheet 2
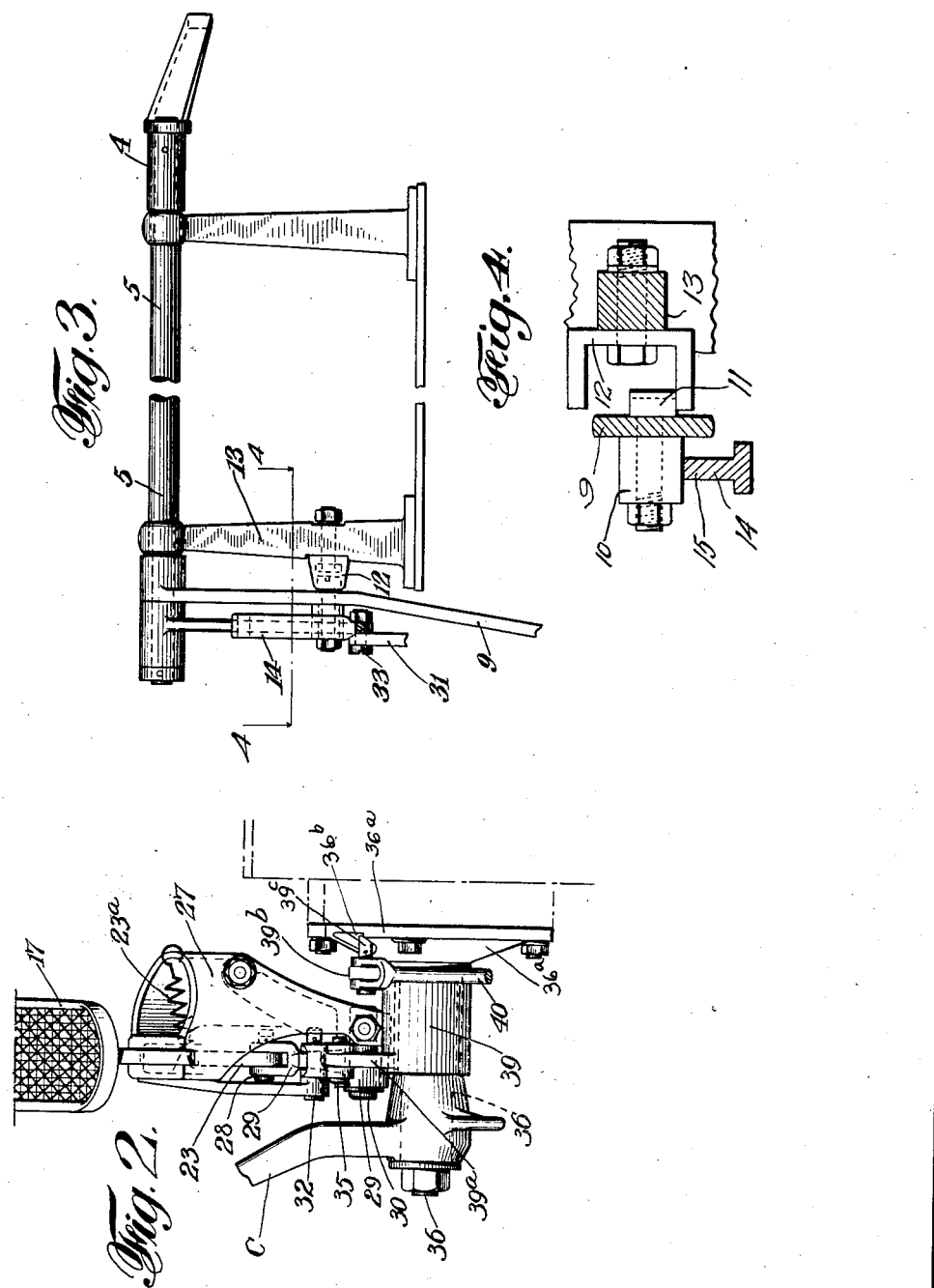
Inventor
Edward A. Rockwell.
by Burton & Burton
his Attorneys.

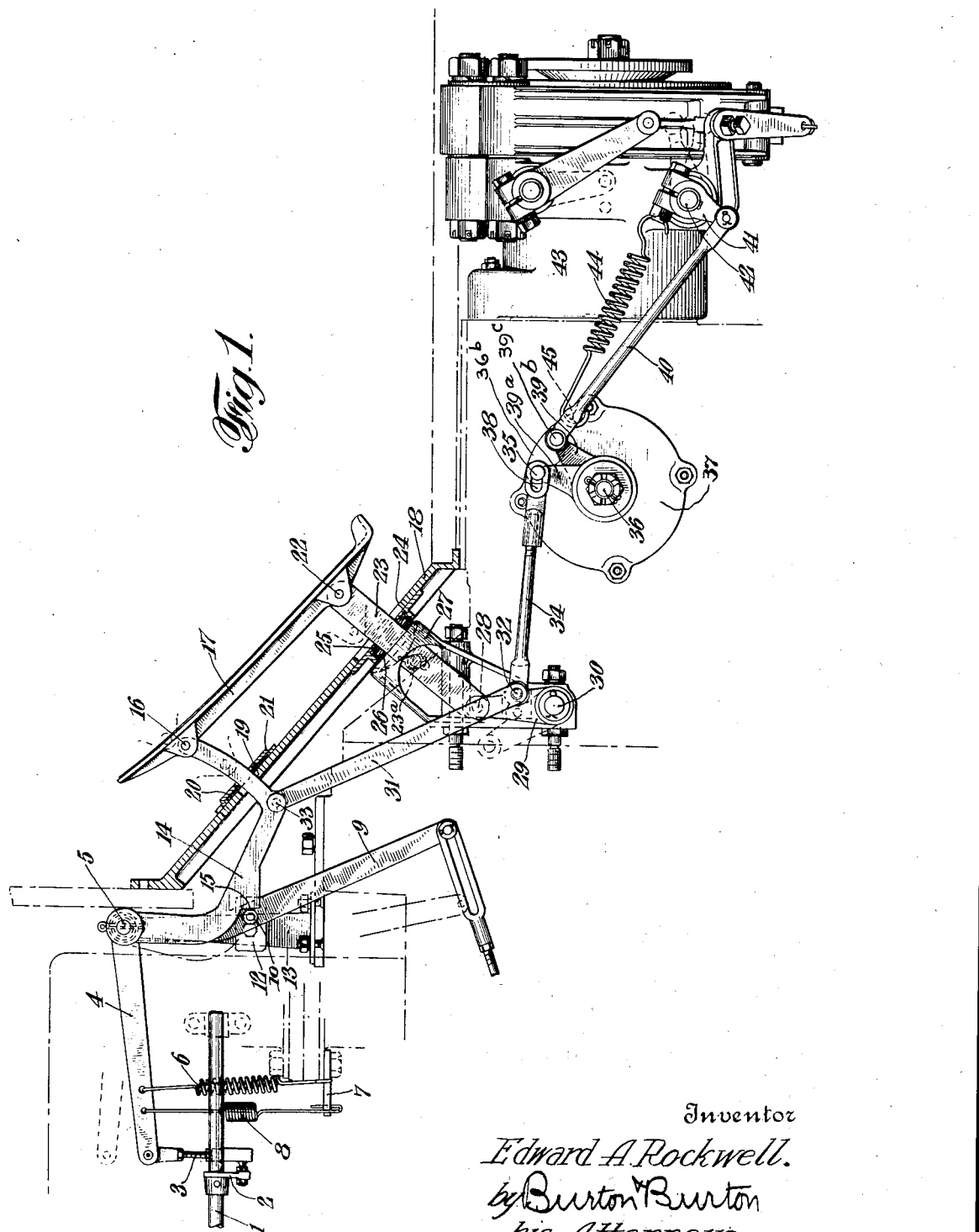

Patented Oct. 18, 1932

1,882,927

UNITED STATES PATENT OFFICE

EDWARD A. ROCKWELL, OF LONG ISLAND CITY, NEW YORK

BRAKE MECHANISM

Application filed October 8, 1927, Serial No. 224,847. Renewed February 25, 1929.

My invention relates particularly to pedal operating mechanism, designed for controlling the operation of power-driven devices, but has relation especially to the operation and control of accelerators and brakes such, for example, as those used upon automobiles.

This invention provides a construction in which there is a combined control for the accelerator and brake means of a vehicle in which the controls are so constructed that the accelerating means is brought to a neutral position before the braking means becomes effective. A further object of the invention consists in a design of linkage connections to the pedal such that there may be independent adjustment of the brake or accelerator connections without changing the normal position of the pedal.

The object of my invention is to provide a construction in which the parts are effectively arranged so as to provide a means of control that is uniform in operation and which may be adjusted effectively so as to obtain the most efficient operation of the apparatus controlled thereby. More particularly, the object is to provide a construction in which there is a pedal designed for alternate operation of the accelerator and brake through the alternate depression of the toe and heel, respectively, and in which a toggle mechanism is brought into action thereby, and which is so constructed that as the toe is depressed, an increasing force comes into action to offset the increasing leverage as the toggle moves towards the middle position.

Another object is to provide a greater range of movement for the toe of the pedal in order to obtain more effective control.

A further object is to arrange the linkage so that the brake band and connecting parts may be adequately adjusted without interfering with the adjustment of the linkage directly connected to the pedal and movable therewith.

Further objects of my invention will appear from the detailed description of the same herein.

While my invention is capable of embodiment in many different forms, for the purpose of illustration I have shown only one form of the same in the accompanying drawings, in which Figure 1 is a side elevation, partly in section of mechanism made in accordance with my invention.

Figure 2 is a rear elevation of the same partly in section.

Figure 3 is an elevation of a part of the shafting, and

Figure 4 is a section at the line 4—4 on Figure 3.

As shown in the accompanying drawings, I provide a throttle-operating shaft, 1, having a lever, 2, keyed thereon adapted to be moved by an adjustable link, 3, connected to a lever, 4, located on a shaft, 5. The lever, 4, has connected thereto a light spring, 6, leading to a bracket, 7, on the engine casing, and a stiff spring, 8, also leading to said bracket, 7, but so arranged as not to be brought into action until after the initial movement of the lever, 4. On the shaft, 5, there is a lever arm, 9, carrying a stop 11 adapted to operate between the arms of a bracket, 12, attached to one of the uprights, 13, adapted to support the shaft, 5, from the engine casing. A U-shaped lever, 14, is loosely carried on the shaft, 5, in such a manner that a projection, 15, thereon is arranged to move the lever, 9, through a stop 10 thereon after the U-shaped lever, 14, has been moved downwardly to a certain extent. The upper end of the U-shaped lever, 14, has a pivot, 16, connecting it with a pedal, 17, located above a floor board, 18, having a slot, 19, through which the lever, 14, passes. A fiber disc, 20, which is adapted to slide laterally, surrounds the part of the lever, 14, passing through the floor board, a plate, 21, being provided to hold the fiber disc, 20, in place. The rear end of the pedal, 17, has a pivot, 22, connecting it to a link, 23, passing through the floor board, 18, the opening in which is kept closed by a sliding plate, 24, retained against the floor board, 18, by a coil spring, 25, in a housing, 26, located above the upper end of a guide bracket, 27, which is also supported from the engine casing. In order to prevent rattling, a spring, 23$^a$, holds the link, 23, against one side of the guide bracket, 27. The lower end of the link, 23, is connected to a pivot, 28, at the end of a lever arm, 29, on a shaft, 30, journalled in the engine casing. A link, 31, pivotally connected at its forward end to the lever, 14, as seen at 33, extends thence in a rearward downwardly inclined direction divergently from the pedal and is pivotally connected at its opposite end at a pivot, 32, on the lever arm, 29, at which there is also connected the forward end of a link, 34, hereinafter referred to as an adjusting rod, which extends from said pivotal connection rearwardly for connection to a pivot, 35, on a lever arm, 39ª, of a bell crank lever, 39, 39ª, 39ᵇ, which is fulcrumed by means of a sleeve, 39, on a stud axle, 36, which is supported on a transmission casing, 37.

In order to provide for adjustment and some free movement or lost motion,—required for reasons hereinafter explained,—of the adjusting rod, 34, upon the depression of the toe of the pedal, 17, said rod is slotted as seen at 38, for its pivotal connection at the pivot, 35, with the lever arm, 39ª, of the bell crank lever, 39, 39ª, 39ᵇ, said lever arm, 39ᵇ, being connected by a link, 40, to a brake-operating lever, 41, on a shaft, 42, journalled in a casing, 43, which encloses braking mechanism which for the present purpose need not be shown or described in detail; and a stretched spring, 44, connected at one end to the forward part of the link, 40, and at the other end to the brake casing, 43, which acts for holding the lever member, 39ª, normally at the position seen in Figure 1, at which it may be understood the brake is not in operation. The movement of the lever arm 39ᵇ, and consequently of the entire bell crank lever 39, is limited by the pivot stud 39ᶜ, which connects the arm 39ᵇ and the link 40. As best shown in Figure 2, this stud 39ᶜ extends into a recess 36ᵇ in the flange 36ª by means of which the axle 36 is secured in place. This recess 36ᵇ is so proportioned as to limit at the proper point the clockwise movement of the bell crank 39 under influence of the spring 44, and also limits movement of the bell crank 36 in the opposite direction under the influence of pedal pressure.

In the operation of this invention it will be noted that the brake mechanism in the casing, 43, and the accelerator or throttle controlled by the movement of the shaft, can be alternatively brought into action by the depression of the toe or the heel of the pedal, 17. It will be noted, however, that the heel of the pedal, 17, can be depressed to operate the brake only when the toe of the pedal is up and the throttle accordingly is in its retracted or initial position; and similarly, the toe of the pedal may be depressed to operate the throttle only when the heel is up and the brake mechanism is not operated for applying the brake. This is due to the relation of the link, 31, to the parts with which it is connected, being such that it constitutes an element of two toggles cooperating for toggle action alternatively with the lever, 29, and with the lever, 14. Thus, on the depression of the heel on the pedal, 17, the joints at the pivots, 30 and 33, are flexed with a negligible flexure of the joint at the pivots 5, and none at the pivot, 28; and on the depression of the toe of the pedal, the joints at the pivots, 5, and 28, are flexed with negligible flexure of the joint, but with somewhat slight movement of the pivot, 28, and very slight and wholly negligible depression of the pedal heel.

Upon consideration of the construction as thus far described, it will be recognized that the resistance of the toggles to the action of the pedal upon depression of either toe or heel, tends to diminish as the toggle approaches straight line position of the toggle elements; and that this condition uncorrected or uncompensated would tend to defeat the accuracy of control which the operator should exercise, particularly over the acceleration, desirably also to some extent over the braking action which are controlled respectively by the toe and heel of the pedal. In respect to the braking action, sufficient resistance is afforded by the presence of the spring, 44. which is stretched by the straightening of the toggle which is operated by the heel of the pedal; and furthermore, the braking action increases resistance as the pedal is depressed and thereby compensates for the diminishing resistance of the toggle. For correcting the defect in respect to acceleration, it will be noticed that upon the operation of the throttle by depression of the toe of the pedal, as the downward movement of the pedal toe proceeds, the spring, 8, is brought into action after the first short movement which takes up the slack in the connection of the lower end of said spring to the bracket arm, 7, and that throughout the remainder of the depressing movement of the pedal toe, the resistance of the spring, 8, increases rapidly, being added to the resistance of the lighter spring, 6; and said spring, 8, may be readily diminished so as to effectively offset and compensate for the diminution of the resistance of the toe-operated toggle, thereby giving the operator accurate control of the acceleration.

It will be apparent that the normal pull of springs 6 and 8 draws the arm 4 downwardly, rocking the shaft 5 in the counterclockwise direction until the stop 11 carried by the lever arm 9 brings up against the rear side of the stop member 12 as best shown in Figure 4. This movement of lever arm 9 carries with it the U-shaped lever 14 by means of the projection 15 on the arm 9. Clockwise movement of the U-shaped lever 14 upon depression of the toe of the pedal is also limited by the stop 11 on lever 9 engaging the forward side of the stop member 12. It will be understood that the lever arm 9 is connected by any suitable means to the usual throttle lever carried on the steering column or other portion of the car for manual operation. The slotted connection at the lower end of lever arm 9 permits throttle operation by the foot pedal without causing movement of the hand throttle.

In the movement of the heel of the pedal for operating the brake by reason of the pivot, 32, being nearer the fulcrum of the lever than the pivot, 28, by which the pedal-actuated link is connected to said lever, the necessary angular movement of the lever for performing its function upon the brake mechanism is accompanied with a much longer movement of the pivot, 28, than of the pivot, 32, and greater depression of the heel of the pedal than if the pivot, 28, were no farther from the fulcrum than the pivot, 32, needs to be for its function of transmitting the action of its pedal to the brake. And by this means the operator is enabled to graduate with greater nicety the rate of application of the brake, while nevertheless it may be completely applied to the limit by very short movement of the heel of the pedal.

Upon comparison of the full line position with the dotted line position of the pedal and the connections, it may be understood that as stated above, the depression of the pedal at the toe for operating the throttle in straightening the toggle consisting of the lever, 14, and the link, 31, thrusts slightly rearward the pivot, 32, slightly rocking the lever, 29, and very slightly,—to a degree imperceptible by the operator whose foot is resting on the pedal,—thrusting the heel of the pedal forward. Since the connections from the pivot, 32, to the lever arm, 41, of the rock shaft, 42, are normally stopped against rearward thrust by the rock shaft, 42, being,— as may be understood without detail illustration, stopped at its position of rest against rocking in the direction in which rearward movement of the pivot, 32, would tend to rock it, provision is necessary at some point in the connection, for lost motion to accommodate this slight rearward movement of the pivot, 32, and slight elongation of the slot, 38, at which the adjusting rod, 34, is engaged with the pivot, 35, provides for this lost motion.

It may be further understood that one purpose of the feature of the construction consisting in the interposition of the lever member comprising the lever arms, 39ª and 39ᵇ, in the linkage between the lever, 29, and the lever arm, 41, of the brake-operating rock shaft, 42, is to accommodate the laterally offset position of the brake casing and protruding end of the rock shaft, 42, with respect to the vertical plane in which the pedal-operating connections are located for most conveniently positioning the pedal; and it will be seen that this purpose is accomplished by the interposition of the lever member mentioned consisting, as described and seen in Figure 2, of a sleeve, 39, mounted on the stud, 36, and having the two lever arms, 39ª and 39ᵇ, offset laterally from each other substantially the length of the sleeve.

Another purpose for interposing this lever member between the two links, 34 and 40, is to effect the connection between the levers, 29 and 41, in a manner avoiding any part of the structure which may be normally or desirably located in the direct line between the two lever connections; and it may be understood from Figure 2 that in the particular construction shown, the stud, 36, on which the lever member, 39, 39ª and 39ᵇ, is fulcrumed, is also the fulcrum of a clutch-operating lever, C, shown in Figure 2, which would have interfered with a direct single link connection between the levers, 29 and 41.

It may be further understood upon consideration of the construction and mode of operation as described, that in order to obtain the precise action desired from the toggles connected with the pedal for operating the throttle and brake, respectively, the entire system of lever and link connections may require some adjustment for making the several toggle angles such that the structure may yield the proper movement, on the particular vehicle on which the system may be mounted, different vehicles of the same design varying slightly in the precise position of the different parts to which the mechanism in question is to be connected, and with which it is to cooperate. It may be understood that this possibility of adjustment is one purpose of the construction of the link, 34, in two pieces screwed together so that the operative length of the link may be adjusted for varying the distance from the pivot, 35, to the pivot, 32, at the rest position of the parts and thereby varying the angle between the lever, 29, and the link, 23, by which the pedal is connected to it and at the same time, but in a very slight degree, varying the angle between the link, 31, and the lever, 29; all the variations thus effected by the adjustment of the length of the link, 34, being independent of the connection by the link, 40, to the brake-operating lever, 41, by reason of the presence of the elongated slot, 38, for connection of the pivot, 35. And it will be understood also that similarly any adjustment of the lever, 41, which may be necessary to accommodate wear or stretch of the braking means (not shown) operated by the shaft, 42, may be compensated by the adjustment of the adjusting rod, 34, as described, without derangement of the toggle angles or the action of the toggles as described in view of the lost motion permitted at the slot, 38.

I claim:

1. In a mechanism for the purpose indicated, in combination with a pedal and means connected therewith for operating alternatively a brake and a motor speed-controlling element, means for accumulating and increasing the resistance of toe pedal movement as said movement proceeds.

2. In a mechanism for the purpose indicated, in combination with a pedal and connections therefrom for operating a motor speed-controlling element, means for accumulating and increasing the resistance to the pedal movement as said movement proceeds from a normal position of rest, which consists in a plurality of springs connected for coming in relation for reaction on the operating connections cumulatively.

3. In the construction defined in claim 2, the spring first coming into action being lighter than the one coming next into action.

4. In the construction defined in claim 1, the operating connections from the pedal comprising a lever member which is operatively connected for actuating the speed-controlling part at a point relatively remote from the fulcrum of said member, the spring first coming into reaction as the pedal is depressed being connected nearer the fulcrum of the lever member than the subsequently operating spring; whereby the latter accumulates resistance more rapidly than the former when it comes into operation.

5. In a mechanism for the purpose indicated, in combination with a pedal, means operated by the pedal for alternatively operating respectively a brake and a motor speed-controlling element, said means each comprising toggle lever devices actuated by the pedal, one in the heel movement and the other in the toe movement thereof, and means for accumulating resistance to the pedal movement as the same proceeds for compensating the increasing leverage and resultant diminishing resistance of the toggle as it approaches straight line position of the toggle elements.

6. In a mechanism for the purpose indicated, in combination with a pedal and toggle lever connections therefrom for operating a motor speed-controlling element, means for accumulating resistance to pedal movement as it proceeds arranged relatively to the toggle parts for compensating by increase of said resistance, diminution of resistance of the toggle resistance as the toggle elements approach a straight line position.

7. In the construction defined in claim 6, the means for increasing the resistance of the motor speed-controlling means consisting of a plurality of springs of different stiffness, and connected for coming into operation in the motor accelerating action of the pedal in the order of their stiffness.

8. In the construction defined in claim 6, the motor speed-controlling connections from the pedal comprising a lever connected for operating the throttle, and the means for accumulating resistance to the pedal movement consisting of a plurality of springs connected to said lever for yieldingly resisting the movement at successively greater distances from the lever fulcrum, and arranged to come into action in the order of their connection to the lever from the fulcrum toward the operating connection of the lever with the throttle.

9. In a construction for the purpose indicated in combination with a pedal, toggle lever mechanism for operating a throttle comprising a lever connected to the throttle, means for increasing the resistance to the throttle-opening movement of the lever to compensate for the decreasing resistance of the toggle lever mechanism as the parts thereof approach alignment, which consists in a plurality of springs connected to said throttle-operating lever at different distances from its fulcrum, a spring at the greater distance being arranged to come into action for resisting said lever movement at a later point in said movement than a spring connected nearer the lever fulcrum.

10. In a construction for the purpose indicated, in combination with a pedal, linkage connecting it for operating a brake comprising two levers having relatively fixed fulcrums, the first lever being linked to the pedal so as to be rocked over its fulcrum by the depression of one end of the pedal, the second lever being a lever arm of a rock shaft for operating the brake; links connected to said levers respectively extending toward each other; a third lever member having its fulcrum fixed with respect to the other two levers, the links being connected at their proximate ends to said third lever member out of line with their opposite end pivotal connections to the first and second lever members respectively; whereby the links operate to communicate rocking movement from the first lever to the second by a course avoiding structure which may intervene in the direct line between the pivotal connections of the links to the levers respectively.

11. In a construction for the purpose indicated, in combination with a pedal, a brake-operating rock shaft having a lever arm by which it may be rocked for operating the brake; a lever having its fulcrum fixed with respect to said rock shaft; operating connections from the pedal to said lever, and operating connections from the lever to the lever arm of the rock shaft, the last mentioned connection comprising two links connected for communication of thrust from the first mentioned lever to the rock shaft lever arm with provision for lost motion between the two links in the thrust; a spring connected for reacting on the rock-shaft-connected-lever yieldingly resisting its movement in the direction for actuating said shaft and for retracting it to rest position, and a second spring connected for reacting on the other link in the direction for resisting the pedal-caused movement of the first lever and said link; whereby the two springs co-operate for retracting the pedal from its brake-operating stroke.

12. In a construction for the purpose indicated, in combination with a pedal connected for operating alternatively a motor speed-controlling element, and a brake by depression of the opposite ends respectively of the pedal, said connections comprising two toggle lever devices for operating the brake and the motor speed-controlling elements respectively, said two devices having a link member in common and comprising respectively a lever for operating the motor speed-controlling element and a lever for operating the brake, linkage from the last mentioned lever to brake-operating means, said linkage comprising a link having provision for lost motion at one of its pivotal connections permitting limited movement without transmitting motion to the brake-operating means.

13. In combination with the construction defined in claim 1, manually operable means for operating the motor speed-controlling element, the pedal-operated connection including a part of the manually operable means with provision for lost motion at the connection with said part.

14. In the construction defined in claim 6, manually operable means for operating the motor speed-controlling element, the pedal-operated connection including a part of the manually operable means with provision for lost motion at the connection with said part.

15. In the construction defined in claim 6, manually operable means for operating the motor speed-controlling element, the pedal-operated means including a part of said manually operable means having a slotted connection for lost motion in the direction of movement of the part which is included in the pedal-operated connections.

16. In the construction defined in claim 6, spring means reacting on the pedal connections for upholding the pedal to a normal rest position.

17. In the construction defined in claim 6, manually operable means for operating the motor speed-controlling element, the pedal-operating connections including a part of the manually operable means, and spring means reacting on said part in the direction for reacting also on the pedal-operated connections for upholding the pedal at a normal position of rest.

18. In the construction defined in claim 1, manually operable means for operating the motor speed-controlling element, the pedal-operated connections including a part of said manually operable means, and springs reacting on the manually operable connections constituting the means for accumulating the resistance to the pedal movement as called for in claim 1.

19. In combination with a motor-propelled vehicle, speed-controlling means including accelerating means for the motor, and braking means for the vehicle; means operable at will for adjusting the motor accelerating means and the vehicle braking means consisting of a pedal, linkage connections for operating the accelerator and the brake respectively, a link connection between said linkages so arranged that the brake setting movement of the brake operating connections opposes the movement of the accelerator operating connections in the direction for acceleration; the pedal being carried by pivotal connection at its rear and forward parts respectively by the brake operating and accelerator operating connections; whereby the pedal is adapted to rock over either of its said pivots for operating the connection from the other pivot.

20. In the construction defined in claim 19, the several connections being proportioned and their pivots relatively positioned so that the pedal movement for operating either of said connections does not operate the other connection.

21. In the construction defined in claim 19, the brake operating and accelerator operating connections comprising each initially a lever element, said lever elements being connected by said link, the pivots for the link on the levers being at substantial distances from the fulcrums of the levers respectively both at the side toward the pedal of the line containing the lever fulcrums; whereby the link completes a connection out of alignment with the two fulcrums and forms with each lever a toggle connection to the other lever, the pedal pivot supports being extended in substantially parallel directions from said toggle pivots respectively; whereby the pivotal movement of the pedal for actuating the accelerator and the brake respectively effect such actuation by straightening the respective toggles.

22. A speed-controlling mechanism comprising a brake, an accelerator, and a pedal for operating the same connected to the accelerator and brake by alternatively operable mechanisms comprising a pair of pivoted levers connected with the toe and heel, respectively, of the pedal adapted to cause the pedal to rock alternatively as over substantially fixed pivots toward the toe and heel respectively.

23. A speed-controlling mechanism comprising a brake, an accelerator, and a pedal for operating the same connected to the accelerator and brake by alternatively operable mechanisms comprising a pair of levers connected with the toe and heel, respectively, of the pedal adapted to cause the pedal to rock alternatively as over substantially fixed pivots toward the heel and toe, the pedal being mounted for deriving slight upward movement at either end from the foot pressure at the other end.

24. A speed-controlling mechanism comprising a brake, an accelerator, and a pedal for operating the same connected to the accelerator and brake by alternatively operable mechanisms comprising two levers connected to the toe and heel of the pedal respectively, and a link connecting the levers together out of alignment with the fixed pivots of said levers; whereby the link and the respective levers form toggle connections each with the other lever adapted to be straightened by the pedal action on the first lever.

25. A speed-controlling mechanism comprising a brake, an accelerator, and a pedal for operating the same connected with the accelerator and brake by alternatively operable mechanism comprising two levers connected with the toe and heel of the pedal respectively, a link connecting the levers at points on them respectively intermediate their respective fulcrums and their connections with the pedal; whereby there are formed two toggles alternatively operable by the rocking of the levers respectively over their respective fulcrums.

26. A speed-controlling mechanism comprising a brake, an accelerator, a pedal for operating both the brake and the accelerator, pivots for the pedal toward the heel and toe of the pedal respectively, alternatively operable means connected between the accelerator and brake and the pedal adjacent said pivots, said alternatively operable means being positioned as to the pivots and connections thereof to permit the pedal to rock over either of its pivotal connections for operating the connection from the other pivot, the pedal being mounted above and substantially parallel with the floor board of the vehicle and having operating connections extending through the floor board.

27. Combined control mechanism for vehicles comprising a pair of lever arms pivoted at spaced fixed points, a link pivotally connecting said arms forming a three bar linkage, a pedal connected to and carried by said linkage for operative rocking movement, accelerating means arranged to be operated by one of said arms and braking means arranged to be operated by the other of said arms.

28. Combined control mechanism for vehicles comprising a pair of lever arms pivoted at spaced fixed points, a link pivotally connecting said arms forming a three bar linkage, a pedal connected to and carried by said linkage for operative rocking movement, accelerating means arranged to be operated by the movement of one of said arms, braking means arranged to be operated by the other of said arms, and means for independently adjusting said accelerating and braking means.

29. Combined control mechanism for motor vehicles comprising a pair of fixed pivots, levers pivotally carried by each of said fixed pivots, a link pivotally connecting said levers out of alignment with the fixed pivots forming a three-bar linkage whereby a rotation of one lever about its pivot in an actuating direction rotates the other lever in the same direction about its pivot but opposite to its corresponding actuating direction, linkage connections moved by one of said levers for operating a throttle, linkage connections moved by the other lever for actuating a brake and a pedal connected to and carried by said three-bar linkage whereby said pedal may be moved by the operator to independently move either the throttle or the brake.

In testimony whereof, I have hereunto set my hand at Chicago, Illinois, this 6th day of October, 1927.

EDWARD A. ROCKWELL.